(12) United States Patent
Negulescu

(10) Patent No.: US 10,450,078 B2
(45) Date of Patent: Oct. 22, 2019

(54) ADAPTIVE AIRCRAFT ENGINE AND AIRCRAFT HAVING AN ADAPTIVE ENGINE

(71) Applicant: Rolls-Royce Deutschland Ltd & Co KG, Blankenfelde-Mahlow (DE)

(72) Inventor: Dimitrie Negulescu, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 521 days.

(21) Appl. No.: 15/168,429

(22) Filed: May 31, 2016

(65) Prior Publication Data

US 2016/0347463 A1 Dec. 1, 2016

(30) Foreign Application Priority Data

May 29, 2015 (DE) .................... 10 2015 209 892

(51) Int. Cl.
*F02K 3/075* (2006.01)
*F02K 3/077* (2006.01)
(Continued)

(52) U.S. Cl.
CPC .............. *B64D 27/16* (2013.01); *B64C 30/00* (2013.01); *F01D 15/12* (2013.01); *F01D 17/162* (2013.01); *F02C 9/18* (2013.01); *F02C 9/22* (2013.01); *F02K 1/15* (2013.01); *F02K 3/06* (2013.01); *F02K 3/077* (2013.01);
(Continued)

(58) Field of Classification Search
CPC ....... B64D 27/16; F01D 15/12; F01D 17/162; B64C 30/00; F02C 9/18; F02C 9/22; F02K 3/075; F02K 1/09; F02K 1/15; F02K 3/02; F02K 3/06; F02K 3/077; F05D 2270/20; F05D 2240/30; F05D 2220/323; F05D 2240/128
See application file for complete search history.

(56) References Cited

U.S. PATENT DOCUMENTS 3,368,352 A 2/1968 Hewson
3,514,952 A * 6/1970 Schumacher ........... F02K 3/075
60/225
(Continued)

FOREIGN PATENT DOCUMENTS

DE 1301650 8/1969
DE 2624164 A1 12/1976
DE 2638882 A1 6/1977

OTHER PUBLICATIONS

Manoharan "Innovative Double Bypass Engine for Increased Performance", Fall 2011, pp. 1-81.*
(Continued)

*Primary Examiner* — Ted Kim
(74) *Attorney, Agent, or Firm* — Shuttleworth & Ingersoll, PLC; Timothy J. Klima

(57) ABSTRACT

An adaptive aircraft engine including a first, inner bypass duct inside a core engine of the aircraft engine and a second, outer bypass duct at least partially surrounding the first bypass duct, and adaption means, in particular adjustable nozzles for altering a flowed-through cross-section of the core engine with the first bypass duct and for altering the flowed-through cross-section of the second bypass duct depending on the flying speed. An aircraft having at least one adaptive aircraft engine is also provided.

17 Claims, 6 Drawing Sheets

(51) Int. Cl.
    *B64C 30/00*   (2006.01)
    *B64D 27/16*   (2006.01)
    *F02K 1/15*    (2006.01)
    *F02K 3/06*    (2006.01)
    *F01D 15/12*   (2006.01)
    *F01D 17/16*   (2006.01)
    *F02C 9/18*    (2006.01)
    *F02C 9/22*    (2006.01)

(52) U.S. Cl.
    CPC .. *F05D 2220/323* (2013.01); *F05D 2240/128* (2013.01); *F05D 2240/30* (2013.01); *F05D 2270/20* (2013.01)

(56) References Cited

U.S. PATENT DOCUMENTS

| | | | |
|---|---|---|---|
| 3,841,091 A * | 10/1974 | Sargisson | F02C 3/13 60/224 |
| 3,854,286 A * | 12/1974 | Klees | F02K 3/025 239/265.11 |
| 3,879,941 A * | 4/1975 | Sargisson | B64D 33/02 137/15.1 |
| 4,039,146 A | 8/1977 | Wagenknecht | |
| 4,064,692 A | 12/1977 | Johnson et al. | |
| 4,085,583 A | 4/1978 | Klees | |
| 4,175,384 A * | 11/1979 | Wagenknecht | F02K 3/075 60/226.3 |
| 5,261,227 A | 11/1993 | Giffin, III | |
| 5,305,599 A * | 4/1994 | Marvin | F02K 1/15 60/226.3 |
| 5,404,713 A | 4/1995 | Johnson | |
| 2003/0132342 A1 | 7/2003 | Koncsek et al. | |
| 2006/0236675 A1 | 10/2006 | Weiler | |
| 2007/0000232 A1 | 1/2007 | Powell et al. | |
| 2007/0186535 A1* | 8/2007 | Powell | F02K 1/08 60/226.1 |
| 2010/0043389 A1* | 2/2010 | Conners | B64D 33/02 60/204 |
| 2011/0167791 A1 | 7/2011 | Johnson et al. | |
| 2015/0113941 A1 | 4/2015 | Buey et al. | |

OTHER PUBLICATIONS

European Search Report dated Oct. 20, 2016 from counterpart European Application No. 16171829.1.
Mueller, Reinhard, Luftstrahltriebwerke: Grundlagen, Charakteristiken, Arbeitsverhalten. Vieweg+Teubner Verlag, 1997, p. 291-293. English Abstract.
Rick, Hans, Gasturbinen und Flugantriebe. Springer-Verlag, 2013. pp. 795-824. English Abstract.

* cited by examiner

ADAPTIVE AIRCRAFT ENGINE AND AIRCRAFT HAVING AN ADAPTIVE ENGINE

REFERENCE TO RELATED APPLICATION

This application claims priority to German Patent Application No. 10 2015 209 892.3 filed on May 29, 2015, the entirety of which is incorporated by reference herein.

BACKGROUND

This invention relates to an adaptive aircraft engine and to an aircraft.

It is known that aircraft engines must have different characteristics in subsonic and supersonic operation if they are to function efficiently. For flight operation, it makes sense to have the highest possible thrust relative to the inflowing air. This means however that very high jet speeds must prevail during take-off, which involves the generation of a high degree of noise. The aim here is to adapt the process such that a correspondingly adapted characteristic applies in the full range from take-off to supersonic flight. So-called Variable Cycle Engines (VCEs) are therefore known in which the bypass ratio of the aircraft engine can be adapted in particular. The state of the art (e.g. Müller, "Luftstrahltriebwerke", 1997, pages 312-313) assumes here that the bypass ratio is high with low Mach numbers and low with high Mach numbers.

SUMMARY

The object is to provide new and more efficient aircraft engines. This is achieved by an aircraft engine having the features as described herein.

Here, the aircraft engine has a first, inner bypass duct inside a core engine. A second, outer bypass duct at least partially surrounds the first bypass duct. Adaption means, in particular adaptive nozzles (i.e. nozzles with an adaptively adjustable cross-section), are used here to alter a flowed-through cross-section of the core engine with the first bypass duct and to alter the flowed-through cross-section of the second bypass duct depending on the flying speed. By using two bypass ducts in conjunction with the adaption means, in particular adaptive nozzles for the cross-sections, the aircraft engine can be operated particularly efficiently in both subsonic and supersonic flight, since the flow resistance can be adaptively adjusted to the respective flying speed.

In one embodiment, an inner, primary nozzle is used to alter the cross-section of the core engine with the first bypass duct and a second, secondary nozzle to alter the cross-section of the second bypass duct, where $$F_{net} = F_{primary, net} + F_{secondary, net}$$

applies for the net thrust of the entire aircraft engine, and $$F_{effective} = F_{net} - \text{resistance of the installed aircraft engine}$$

applies for the effective thrust of the entire aircraft engine. In this embodiment, the proportion of the net thrust $F_{primary, net}$ of the primary nozzle and/or the proportion of the net thrust $F_{secondary, net}$ can be set depending on the flying speed, in particular to values for $F_{primary, net}$ of 50% of the net thrust ($F_{net}$) in the case of take-off (maximum take-off), up to 91% of the net thrust ($F_{net}$) in the case of cruise speed (supersonic cruise speed), and to the value for $F_{secondary, net}$ of 50% of the net thrust ($F_{net}$) in the case of take-off (maximum take-off), up to 9% of the net thrust ($F_{net}$) in the case of cruise speed (supersonic cruise speed). Hence, the proportion of the thrust through the primary nozzle (i.e. the inner nozzle) increases with the flying speed. The proportion of the thrust through the secondary nozzle (i.e. the outer nozzle) decreases correspondingly as the flying speed increases.

In one embodiment, a flowed-through cross-section of the second, outer bypass duct can be enlarged, in particular maximized, with the outer, secondary nozzle in the case of supersonic flow, in particular at Ma>1.4. By enlarging the at least one cross-section, the flow resistance of the outer parts of the aircraft engine at high speeds can be minimized. In an alternative or additional embodiment, a flowed-through cross-section of the second bypass duct can be correspondingly reduced, in particular minimized, with the outer, secondary nozzle in the case of subsonic flow, in particular at Ma<0.8.

In a further embodiment, the flowed-through cross-section of the second bypass duct can be enlarged with the secondary nozzle such that in the case of supersonic flow the difference between the net thrust of the secondary nozzle ($F_{secondary, effective}$) and the installation resistance of the secondary circuit ($ID_{secondary}$)—i.e. the effective thrust ($F_{secondary, effective}$) of the secondary nozzle—becomes low, in particular minimal.

If in one embodiment of the adaptive aircraft engine an additional inlet is provided in the inlet area of the aircraft engine, it can be opened in subsonic conditions and closed in supersonic conditions.

For setting the respective operating conditions, a fan rotor, at least one controllable or regulatable fan outlet guide vane, at least one controllable or regulatable inlet guide vane of a low-pressure turbine and/or at least one controllable or regulatable outlet guide vane of a low-pressure turbine is provided in one embodiment. Together with the cross-sections settable in particular using nozzles, adaptation to the necessary operating conditions can be made here in each case.

Additionally or alternatively, one embodiment can have a fan rotor which is coupled to a high-performance gearbox and can be driven via a turbine stage. This fan rotor can have in particular adjustable blades. Using the high-performance gearbox allows the fan rotor and the turbine stage driving it to be operated at optimized speeds in each case.

In a further embodiment, the aircraft engine is designed such that it has no after-burner. Operation of an after-burner is very loud, so that an after-burner-free civil aircraft in particular can be operated with fewer restrictions. This measure also reduces the emission of NOX gases.

In one embodiment, it is possible to set for the outer bypass duct in the subsonic range a bypass ratio $$\frac{\text{Flow through first and second bypass duct}}{\text{Flow through fan rotor} - (\text{Flow through first and second bypass duct})}$$

of less than 4, in particular 3.8. In an alternative or additional embodiment, a second bypass ratio (flow through inner bypass duct/flow through the inner part of the core engine) is settable between 1.2 and 0.8, in particular 1 for the inner bypass duct in the supersonic and subsonic range.

In one embodiment, a regulating or control device is provided with which the setting of the adaption means, in particular of the primary and/or secondary nozzles, of the at least one fan outlet guide vane, of the at least one inlet guide vane of the low-pressure turbine and/or of the at least one outlet guide vane of the low-pressure turbine can be made depending on the speed of the aircraft engine. It is thus possible to obtain an optimum effect by a common setting (e.g. by a central control such as EEC) of the primary and secondary nozzles, of the fan outlet guide vane, of the inlet guide vane of the low-pressure turbine and of the outlet guide vane of the low-pressure turbine.

In a further embodiment, the low-pressure turbine can be driven at least partially by a flow from a combustion chamber and a flow from the inner bypass duct.

In a further embodiment, an outer nacelle and/or the core engine are/is designed axis-symmetrical.

In a further embodiment, the adaptive aircraft engine has a dual-flow three-shaft engine with two bypass ducts, in particular with a mixing device for a flow from the combustion chamber and a flow from the inner bypass duct, where the mixing device is arranged in front of the low-pressure turbine in the flow direction.

Solution is provided by an aircraft having the features as described. In one embodiment, the at least one aircraft engine is arranged at the tail, in particular above a wing of the aircraft.

BRIEF DESCRIPTION OF THE DRAWINGS

The present invention is described with reference to the exemplary embodiments shown in the figures.

DETAILED DESCRIPTION

Figure 1:
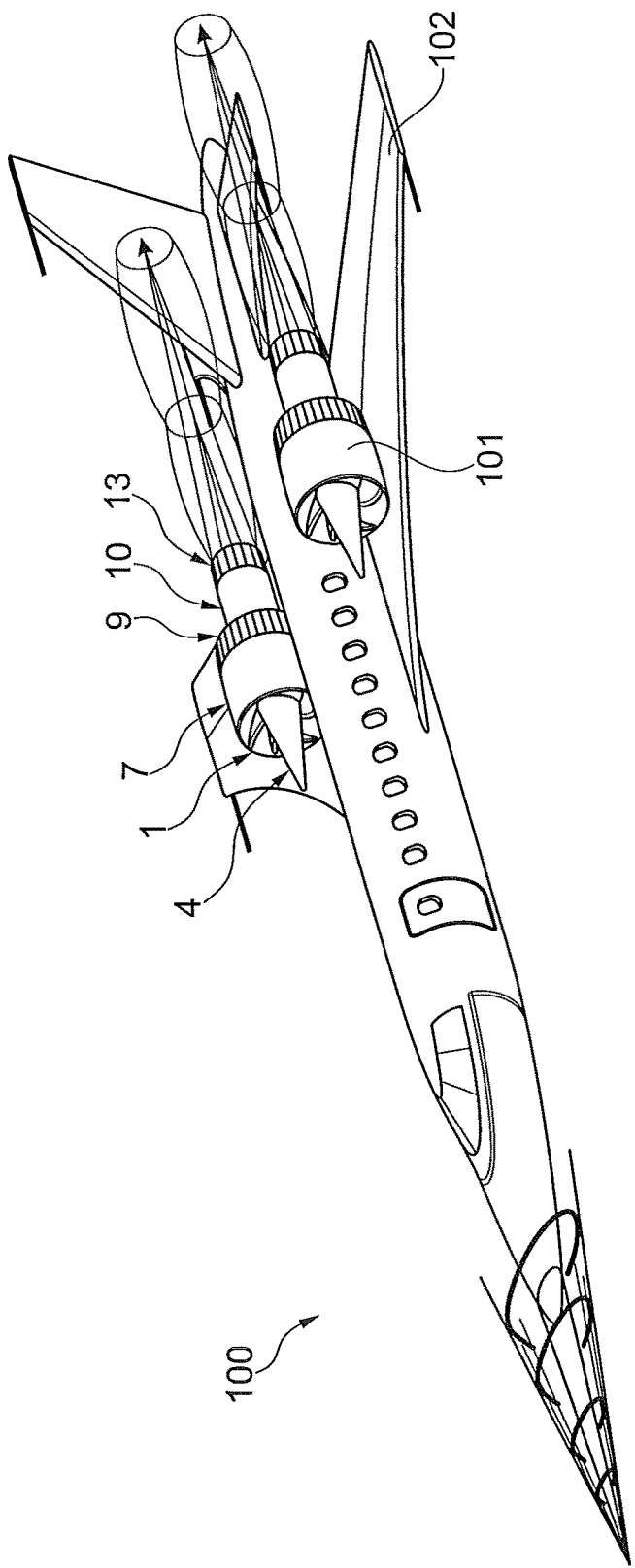
FIG. 1 shows the structure of an aircraft with an embodiment of an aircraft engine for subsonic and supersonic operation.

FIG. 1 shows by way of example an aircraft 100 designed for a cruise speed of Ma=1.75. In the following, all numerical values in particular must be understood only as examples. Embodiments of the aircraft engines 101 can for example also be used in aircraft 100 having different dimensions.

The aircraft 100 according to the embodiment shown is a supersonic business jet (SSBJ). The latter is provided with adaptive aircraft engines 101 permitting flight operation in which the air inlet is adapted to the respective flying speed (e.g. Ma=0 to 1.75), as is described in the following.

The adaptive aircraft engines 101 are designed as dual-circuit three-shaft aircraft engines and are arranged above the wings 102. The aircraft engines 101 have a length of approx. 7 m. The diameter of a nacelle 7 (outer nacelle) of the aircraft engines 101 is approx. 1.9 m. The diameter of a core engine cowling 10 is 1.4 m.

The aircraft 100 has a fuselage length of 36 m and a wingspan of 21 m. The total wing surface area is 120 m$^2$. The assumed maximum take-off weight is 100,000 lb (45.4 t).

The aircraft 100 shown has a lance-like nose, with flat cross-sectional shape, and designed in particular for supersonic flight. Other embodiments of the aircraft 100 can also have other dimensions and/or shapes.

Figure 2:
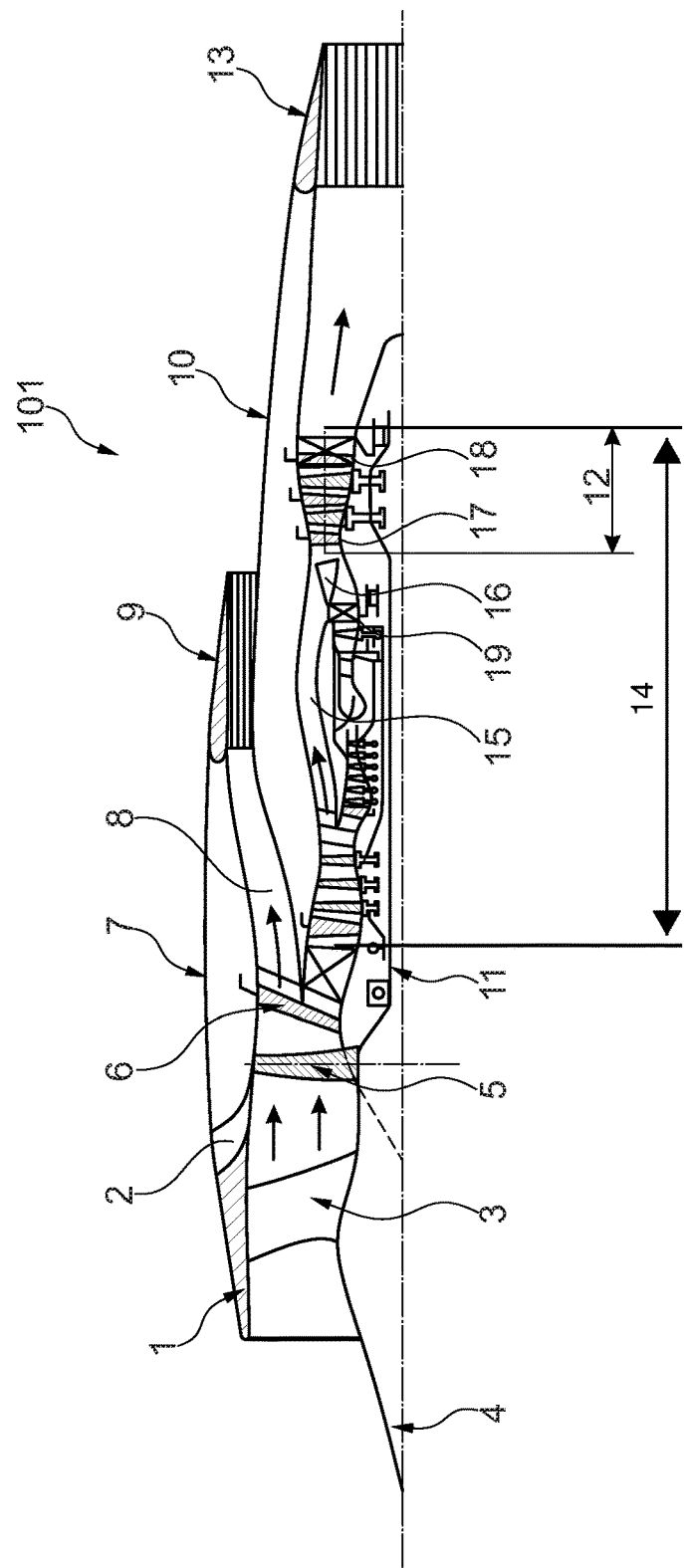
FIG. 2 shows a cross-section through an embodiment of the aircraft engine in the operating position for low mach numbers.

At the inlets of the adaptive aircraft engines 101, conical central inlet elements 4 are provided in each case, which are radially surrounded by an inlet lip 1 (see also FIG. 2). The inlet can also have a different design in other embodiments, as was the case in the Concorde, for example.

Figure 3:
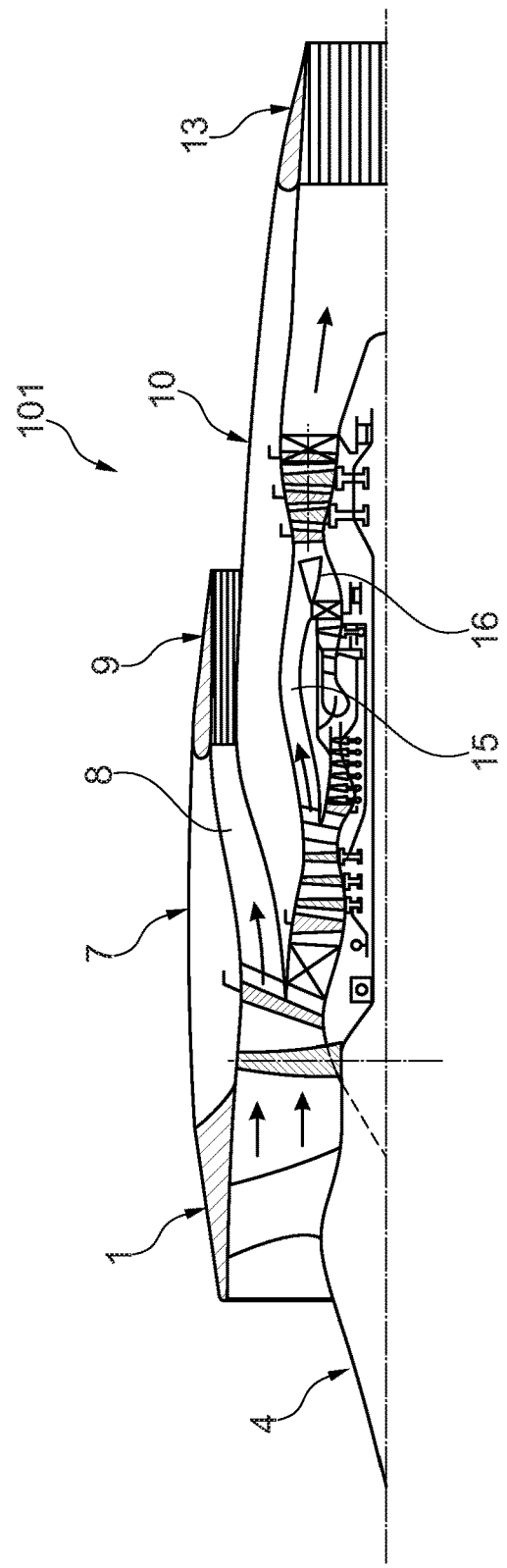
FIG. 3 shows a cross-section through an embodiment of the aircraft engine in the operating position for high subsonic flight.
Figure 4:
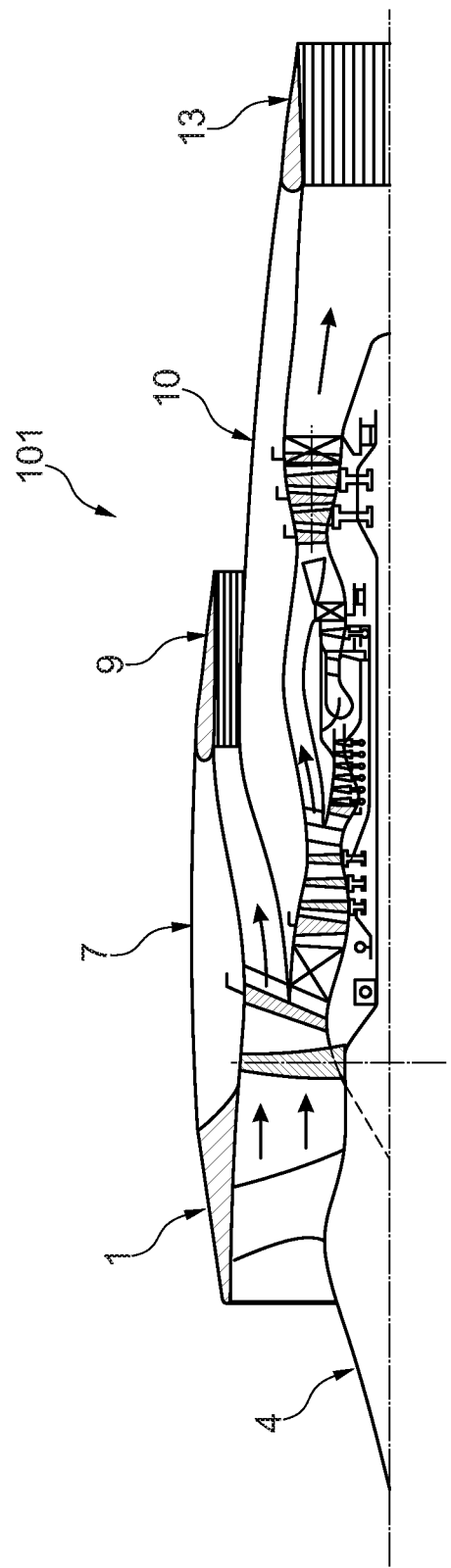
FIG. 4 shows a cross-section through an embodiment of the aircraft engine in the operating position for supersonic flight.

At the rear end of the adaptive aircraft engines 101, two nozzles 9, 13 are arranged in each case, whose cross-sections can be adaptively set in a convergent-divergent manner, as shown in more details in connection with FIGS. 2 to 4.

These two aircraft engines 101 each have a maximum take-off thrust of 20,000 lbf (88,964.4 N). The thrust at the nominal cruise speed of Ma=1.75 is in each case 6,000 lbf (26,689.3 N). The thrust at cruise speed is here 30% of the thrust during take-off. As already noted above, other aircraft with other embodiments of the aircraft engines 101 can have different values for thrust and speeds.

The aircraft 100 described here and its units must be understood only as examples, meaning that the adaptive aircraft engines 101 can also be arranged on civil or military aircraft of different designs or dimensions. In particular, the sizes and/or the performance specifications of the aircraft engines 101 can be of different design in other embodiments. It is also possible for more than two of the adaptive aircraft engines 101 to be used in an aircraft 100.

It is assured by the adaptive aircraft engines 101 that during take-off and subsonic flight (e.g. Ma<0.8), a fan engine with a relatively high bypass ratio is available. This ensures a reduction in take-off noise and in fuel consumption. During supersonic flight (e.g. Ma>1.4) it is assured by suitable cross-sectional changes in the nozzles 9, 13, which interact with two bypass ducts 8, 15, that the flow resistance of the aircraft engines 101 is low. The outer nozzle 9 is downstream of the outer bypass duct 8, the inner nozzle 13 is downstream of the inner bypass duct 15 and downstream of a low-pressure turbine 12.

The low-pressure turbine 12 is arranged here such that it is subjected not only to the outflowing gases from a combustion chamber of the core engine 14, but also to the flow inside the inner bypass duct 15, i.e. both flows drive the low-pressure turbine 12. In front of the low-pressure turbine 12, a mixing device 16—e.g. a mixing chamber—is arranged in which the two flows can mix. This provides a flow in which the flows from the inner bypass duct 15 and from the intermediate-pressure turbine 19 are mixed in the mixing device 16. The flow of the core engine 14 then acts on the low-pressure turbine 12.

FIG. 2 shows a three-shaft turbofan engine 101 in half-section.

The aircraft engine 101 has on the outside a relatively short nacelle 7 surrounding a core engine 14 with its core engine cowling 10. FIG. 2 shows here the adaptive aircraft engine 101 in a configuration applying during take-off or during flight with a low Mach number (e.g. Ma<0.8). The aircraft engine 101 has here two bypass ducts 8, 15, the outer, second bypass duct 8, surrounding the core engine casing 10 at least partially, and the inner, first bypass duct 15 inside the core engine 14.

In the embodiment shown, the aircraft engine 101 is designed rotationally symmetrical about the dash-dotted center axis. In other embodiments, the nacelle 7 in particular can diverge from a rotationally symmetrical shape, as is known from the Boeing 737-600 (next generation), for example.

The air inlet of the aircraft engine 101 in front of the fan rotor 5 (here with a diameter of approx. 1.4 m) includes the air inlet lip 1, an additional inlet 2 (shown here in an opened position), inlet struts 3 and the conical central inlet element 4 fastened to the inlet struts 3. Hence, a regulatable supersonic inlet known per se is obtained in which a variable inlet geometry is provided by moving of the outer inlet lip 1 forward.

Opening of the additional inlet 2 permits vibration-free fan operation during take-off and flight in the low subsonic range (e.g. Ma<0.8).

A controllable or regulatable (adaptive) fan outlet guide vane 6 is arranged behind the fan rotor 5. The fan rotor 5 is driven via a low-pressure shaft 11 by a low-pressure turbine 12 (designed with one or two stages) at the rear end of the aircraft engine 101. For adjustment to the respective load state, controllable or regulatable (adaptive) inlet guide vanes 17 (NGVs) and a controllable or regulatable (adaptive) outlet guide vane 18 (OGV) are provided for the low-pressure turbine 12. The low-pressure turbine 12 is driven by the gas mixture of the two-shaft core engine 14. After that, the gas flow of the low-pressure turbine 12 through the controllable or regulatable (i.e. adaptive) primary nozzle 13 is relieved to the outside.

Downstream of the controllable or regulatable fan outlet guide vane 6, the total throughput of air splits into two parts.

The main proportion of incoming air flows through the outer bypass duct 8 and is then relieved by the variable (i.e. adaptive) convergent-divergent nozzle 9. For the take-off state (MTO), the first bypass ratio, i.e. the ratio between the flow through the outer bypass duct 8 and the flow through the core engine 14, is about 1.4, or lower than 1.6.

The lower core mass flow is passed to the core engine 14 (with controllable or regulatable inlet guide vane). The core engine 14 is a dual-circuit two-shaft turbofan engine with the inner bypass duct 15 and with a mixing chamber as a mixing device 16. This engine is a turbofan engine known per se (with a stage configuration 3+6/1+1) with a second bypass ratio (i.e. the bypass ratio in the core engine 14) of about 1. The core engine 14 has no after-burner, which has in particular a noise-reducing effect. This also has a positive effect on economy and on NOX emissions. The stage configuration can vary, so that a 2+6/1+1 configuration, for example, is also possible.

The flow mixture from the mixing device 16, i.e. a mixture of a flow from the intermediate-pressure turbine 19 of the core engine 14 with the flow from the inner bypass duct 15, is passed to the low-pressure turbine 12 and is thus used to drive the fan rotor 5.

The low-pressure turbine 12 is driven here by a relatively high throughput, and works here relatively cold and can accordingly as a general principle also be designed single-stage. In the embodiment shown in FIG. 2, the low-pressure turbine 12 is designed two-stage. The speeds for an operation in the subsonic range can be, for example, 5,700 rpm for the low-pressure shaft, 8,200 rpm for the intermediate-pressure shaft and 13,500 rpm for the high-pressure shaft.

The air inlet lip 1 is slid well forward in FIG. 2 and thereby releases an opening.

Both nozzles 9, 13 are, in the operating situation as shown, set to the smallest nozzle cross-section. Cross-section adjusting mechanisms (e.g. an adjustable thrust nozzle (iris nozzle)) are used for setting each nozzle cross-section. The nozzles 9, 13 are therefore designed convergent-divergent for regulation independently of one another.

An engine regulation system has adapted the relevant engine components (in particular the opening state of the additional inlet 2) accordingly for take-off and for flight in the low-Mach mode.

The following shows in connection with FIG. 3 how an adaptation to other speed ranges can be achieved, with the opening of the nozzles 9, 13 being dependent on the Mach number.

At higher speeds, i.e. during high subsonic flight or at about Mach 1, the aircraft engine 101 adapts accordingly. Reference can be made here to the description of the aircraft engine 101 in the above description of FIG. 2.

Unlike in the configuration, the additional inlet 2 is now closed. The nacelle 7 is adapted for the lowest induced resistance.

The fan rotor 5 is supplied through the inlet with the necessary air throughput, with minimum inlet losses. The nozzles 9, 13 remain set to their smallest cross-section and are always ready to open during supersonic flight.

A large first bypass ratio (i.e. ratio of flow through the outer, first bypass duct 8 and flow through the core engine 14) is unsuitable for supersonic flight for two reasons; firstly due to the falling net thrust as the Mach number rises, and secondly due to the large installation resistance, caused by the large front face of the aircraft engine 101 with high first bypass ratio.

The speeds for an operation in this speed range can be for example 5,500 rpm for the low-pressure shaft, 8,000 rpm for the intermediate-pressure shaft and 13,000 rpm for the high-pressure shaft. Here too, it is important that the values are of course adapted to the aircraft and the flight conditions.

For Ma~1.75, turbofan engines are generally suitable with a moderate second bypass ratio (ratio of flow through bypass duct 15 to flow through the appropriate part of the core engine 14) of ~1. These are turbofan engines with a core engine 14 of relatively large design. An aircraft engine 101 of this type can deliver the thrust needed for supersonic flight without using an after-burner. As a result, the aircraft engines 101 have low fuel consumption and long range, and provide the environmental compatibility required to be approved for supersonic continental flights.

FIG. 4 shows the configuration of the aircraft engine 101 from FIG. 2 and FIG. 3 for supersonic flight, where a core engine 14 with the inner, second bypass duct 15 is used.

The low-pressure circuit (fan rotor 5 and low-pressure turbine 12) are here set to a favourable supersonic mode. The dual-circuit two-shaft core engine 14 by contrast is operated at high power with the second bypass ratio of approximately 1.

The additional inlet 2 works closed in supersonic flight. The convergent-divergent nozzles 9, 13 are now fully opened, i.e. a maximum cross-section is released.

Due to the low-pressure turbine 12, in a suitable setting of the inlet guide vane 17, of the outlet guide vane 18 and of the fan rotor 5, only a low power is delivered, which is sufficient to provide a pressure ratio at the fan rotor 5 of approx. 1.15 to 1.17 with an adjusted speed of the low-pressure shaft. This is sufficient to make up for the thrust losses from the inlet in the supersonic setting and for the pressure losses from the outer bypass duct 8 and the outer nozzle 9. The result is therefore that the fan rotor 5 delivers a minimum effective thrust; a minimum effective thrust prevails in the secondary circuit.

The flow in the inlet duct behind the inlet neck is in the subsonic range and has, in front of the fan rotor 5, a radially uniform distribution of the flow parameters. This distribution is assured by the opened outer nozzle 9. Due to the nozzle 9 being set to the maximum cross-sectional opening, the largest proportion of air flows unhindered from the air inlet through the outer bypass duct 8 with an only slightly higher dynamic pressure than the dynamic pressure of the unhindered supersonic flow of the aircraft engine 101 in front of the inlet.

After being relieved by the supersonic nozzle 9, the pressure distribution to the outer and inner contours of the outer nacelle (air inlet lip 1, outer nacelle 7 and outer nozzle 9) results in a minimum effective thrust which is greater than or equal to the flow resistance of the outer engine circuit.

In supersonic mode, the engine control, not shown here, deliberately sets the outer bypass flow 8 to a minimum thrust (i.e. the net thrust approximates to the installation resistance). As a result, the aircraft engine 101 is "shrunk" to an aircraft engine 101 with a second bypass ratio of 1, with minimum additional fuel consumption (for driving the fan rotor 5 in the supersonic mode). The outer nacelle 7 of this aircraft engine 101, i.e. the nacelle 7 which is relevant for the installation losses, is reduced to the core engine cowling 10 with a smaller diameter.

The turbofan engine 101 thus transformed by control or regulation is particularly suitable for quiet, economical and clean supersonic flight. At the same time, the engine control sets the two-shaft core engine 14 (second bypass ratio approx. 1) to supersonic cruise speed power. The total throughput of the core engine 14 (less than 50% of the inlet throughput, in particular 42% thereof) ensures the necessary clean thrust for supersonic cruise flight due to relief by the appropriately controlled low-pressure turbine 12 and then by the fully opened convergent-divergent nozzle 13.

The speeds for an operation in the supersonic range can be, for example for the low-pressure shaft, 4,000 rpm, for the intermediate-pressure shaft 8,200 rpm, and for the high-pressure shaft 13,500 rpm.

The adaptive aircraft engine 101 can thus be optimally adapted over the entire operating range to the respective flow conditions. With comparatively low Mach numbers (FIGS. 2, 3), the fan rotor 5 and the outer part of the aircraft engine 101 deliver a significant proportion of the thrust.

The proportions of the aircraft engine 101 with a large area in the flow cross-section are "switched off" for supersonic flight (see FIG. 4). The large, in particular maximum opening of the outer nozzle 9 and the configuration of the aircraft engine 101 described here thus have the effect that those parts of the aircraft engine 101 outside the core engine 14 have no noteworthy flow resistance. The thrust then originates substantially only from the core engine 14.

Figure 5:
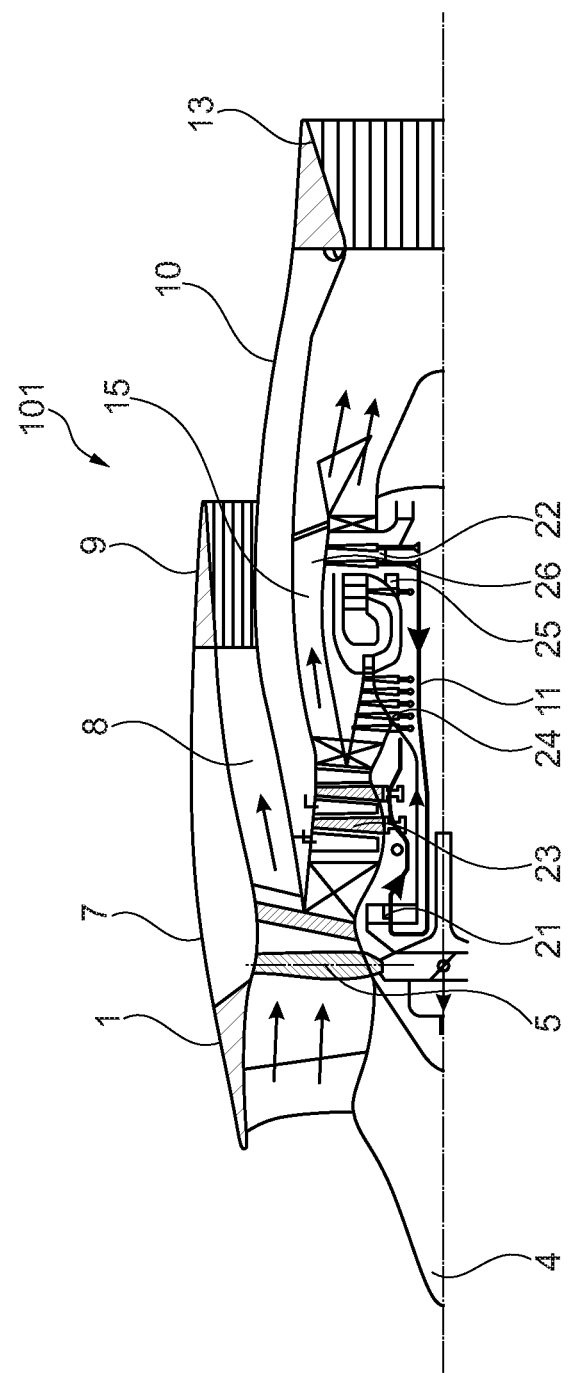
FIG. 5 shows a cross-section of an embodiment with a high-performance gearbox.

FIG. 5 shows a further embodiment representing a variation of the previously shown embodiments. Generally speaking, reference can thus be made to the above descriptions, where in the aircraft engine 101 a high-performance gearbox 21—designed as a planetary gearbox—is provided and arranged between the fan rotor 5 and the low-pressure shaft 11. The high-performance gearbox 21 is a differential power gearbox (DPGB).

As is the case in turbofan engines known per se, the fan rotor 5 can, due to the inserted high-performance gearbox 21, be operated at a lower speed than the low-pressure turbine 22. The fan rotor 5 has adjustable blades.

With this embodiment, the outer diameter, for example, of the outer nacelle 7 can be between 100 cm and 170 cm at the air inlet lip 7. The outer diameter at the primary nozzle 13 can be between 80 cm and 120 cm.

The aircraft engine 101 furthermore has an intermediate-pressure compressor 23, a high-pressure compressor 24, a high-pressure turbine 25 and the low-pressure turbine 22.

Figure 6:
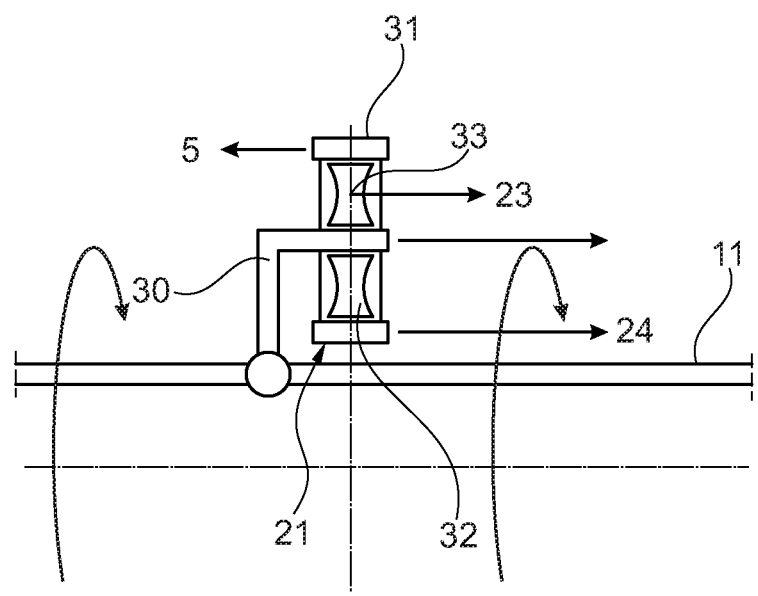
FIG. 6 shows a schematic representation of the coupling of the shaft according to the embodiment in FIG. 5.

Power is input into the high-performance gearbox 21 via the low-pressure shaft 11 (see also FIG. 6). The carrier 30 of the high-performance gearbox 21 drives the intermediate-pressure compressor 23. The outer race 31 of the planetary gearbox 21 drives the fan rotor 5. Part of the power required by the high-pressure compressor 24 is supplied via the sun gear 32 of the planetary gearbox 21. Power is thus input to the high-pressure compressor 24 via the high-pressure turbine 25 ($P_{HDT}$) and the high-performance gearbox 21 ($P_{ad}$).

The speed ratio of the high-performance gearbox 21, the inclination angle of the rotor blades of the fan rotor 5 and the cross-sectional geometries of the primary nozzle 13 and secondary nozzle 9 are thus available as control variables (or design variables) for controlling the aircraft engine.

The following specifies a simplified model with the following relationships:

$$P_{NDT}=P_{DPGB}+P_{MDV}$$

$$\eta P_{DPGB}=P_{Fan}+P_{ad}$$

$$P_{ad}+P_{HDT}=P_{HDV}$$

$$(N_{HDT}-N_{NDT})/(N_{NDT}-N_{Fan})=i=\text{const}$$

$$P_{Fan}/P_{ad}=i(N_{Fan}/N_{HDT})$$

$P_{Fan}=f_1$ (beta, $N_{Fan}$, secondary nozzle geometry)
$P_{HDT}=f_2$ ($W_f$, primary nozzle geometry)
$P_{NDT}=f_3$ ($W_f$, primary and secondary nozzle geometry)
Outlet conditions for primary and secondary nozzles, where:
$P_{NDT}$ Power of low-pressure turbine
$P_{DPGB}$ Power of high-performance gearbox
$P_{MDV}$ Power of intermediate-pressure compressor
$P_{Fan}$ Power of fan
$P_{ad}$ Additional power for high-pressure compressor
$P_{HDT}$ Power of high-pressure turbine
$P_{HDV}$ Power of high-pressure compressor
$N_{HDT}$ Speed of high-pressure turbine
$N_{NDT}$ Speed of low-pressure turbine
$N_{Fan}$ Speed of fan rotor
$W_f$ Fuel throughput
$f_1$, $f_2$, $f_3$ Functional relationships
beta Fan setting parameter
$\eta$ Efficiency of high-performance gearbox It can be seen from the model that the low-pressure turbine 22 drives the high-performance gearbox 21, the fan rotor 5 and the intermediate-pressure compressor 23.

The additional power $P_{ad}$ corresponds to the difference between the power input of the high-pressure compressor 24 and the power output of the high-pressure turbine 25.

In one embodiment, the ratio of the race diameter of the high-performance gearbox 21 to the planetary gear diameters can be i≈2.12. The high-performance gearbox 21 weighs approx. 300 kg.

FIG. 6 shows in schematic form the coupling of the shafts, compressors and turbines of the embodiment according to FIG. 5.

The low-pressure shaft 11 rotates in the direction indicated. In front, i.e. in FIG. 6 on the left of the high-performance gearbox 21 (designed as a planetary gearbox), the low-pressure shaft 11 is connected to the carrier 30 of the planetary gearbox 21. The shaft of the intermediate-pressure compressor 23 is driven via the carrier 30 (indicated by an arrow in FIG. 6).

The fan rotor 5 is driven via the outer race 31 of the planetary gearbox 21 (indicated by an arrow in FIG. 5).

Power is transmitted to the high-pressure compressor 24 via the sun gear 32 of the planetary gearbox 21.

What is claimed is:

1. An adaptive aircraft engine for subsonic and supersonic operation of an aircraft, comprising:
    a dual-flow three-shaft engine including:
        an inner first bypass duct;
        an outer second bypass duct;
        a fan rotor;
        a core engine including:
            the first bypass duct;
            a compressor;
            a combustion chamber; and
        a turbine, including a low pressure turbine connected to the fan rotor to drive the fan rotor;
    wherein the first bypass duct is positioned inside the core engine;
    wherein the second bypass duct at least partially surrounds the first bypass duct,
    an adaption system including an inner, primary nozzle positioned aft of the core engine with the first bypass duct for altering a flowed-through cross-section of flow from the core engine with the first bypass duct and an outer, secondary nozzle positioned at an aft portion of the second bypass duct for altering a flowed-through cross-section of the second bypass duct, depending on a flying speed;
    wherein at least one chosen from the primary nozzle and the secondary nozzle are movable to provide a converging-diverging configuration for supersonic cruise speed;
    a mixing device for mixing a flow from the combustion chamber and a flow from the first bypass duct to form a mixed flow, where the mixing device is arranged in front of the low pressure turbine in a flow direction to pass the mixed flow to the low pressure turbine.

2. The adaptive aircraft engine in accordance with claim 1, wherein a net thrust of the aircraft engine $F_{net}$ equals:

$$F_{net}=F_{primary,net}+F_{secondary,net};$$

where $F_{primary,\ net}$ is a net thrust of the inner, primary nozzle and $F_{secondary,\ net}$ is a net thrust of the outer, secondary nozzle;
where an effective thrust of the aircraft engine $F_{effective}$ equals:

$$F_{effective}=F_{net}-\text{resistance of the aircraft engine as installed};$$

where a proportion of at least one chosen from $F_{primary,\ net}$ and $F_{secondary,\ net}$ is set depending on the flying speed as follows:
    to values for $F_{primary,\ net}$ of 50% $F_{net}$ during take-off and UP to 91% of $F_{net}$ during supersonic cruise speed; and
    to values for $F_{secondary,\ net}$ of 50% of $F_{net}$ during take-off, and up to 9% of $F_{net}$ during supersonic cruise speed.

3. The adaptive aircraft engine in accordance with claim 2, wherein the flowed-through cross-section of the second bypass duct is maximized by the outer, secondary nozzle in the case of supersonic flow where Ma>1.4.

4. The adaptive aircraft engine in accordance with claim 2, wherein the flowed-through cross-section of the second bypass duct is minimized by the outer, secondary nozzle in the case of subsonic flow where Ma<0.8.

5. The adaptive aircraft engine in accordance with claim 1, wherein the flowed-through cross-section of the second bypass duct is enlarged by the outer, secondary nozzle during supersonic flow.

6. The adaptive aircraft engine in accordance with claim 1, wherein the flowed-through cross-section of the second bypass duct is reduced by the outer, secondary nozzle during subsonic flow.

7. The adaptive aircraft engine in accordance with claim 1, wherein the flowed-through cross-section of the second bypass duct is enlarged by the outer, secondary nozzle such that during supersonic flow, an effective thrust $F_{secondary,\ effective}$ of the secondary nozzle, defined as a difference between the net thrust of the outer, secondary nozzle $F_{secondary,\ effective}$ and an installation resistance of the outer, secondary nozzle $ID_{secondary}$, is decreased.

8. The adaptive aircraft engine in accordance with claim 1, and further comprising an additional inlet in an inlet area of the aircraft engine that is opened in subsonic conditions and closed in supersonic conditions.

9. The adaptive aircraft engine in accordance with claim 1, further comprising at least one chosen from a controllable or regulatable fan outlet guide vane, a controllable or regulatable inlet guide vane of the low pressure turbine and a controllable or regulatable outlet guide vane of the low pressure turbine.

10. The adaptive aircraft engine in accordance with claim 1, wherein the aircraft engine is free of an after-burner.

11. The adaptive aircraft engine in accordance with claim 1, wherein during subsonic operation, a bypass ratio $$\frac{\text{Flow through first and second bypass duct}}{\text{Flow through fan rotor} - (\text{Flow through first and second bypass duct})}$$

is less then 4.

12. The adaptive aircraft engine in accordance with claim 1, wherein a bypass ratio is between 1.2 and 0.8 for the inner bypass duct during the supersonic and subsonic operation.

13. The adaptive aircraft engine in accordance with claim 1, further comprising a fan outlet guide vane, an inlet guide vane of the low pressure turbine, an outlet guide vane of the low pressure turbine and a regulating or control device for setting at least one chosen from the adaption system, the fan outlet guide vane, the inlet guide vane of the low pressure turbine and the outlet guide vane of the low pressure, depending on the flying speed.

14. The adaptive aircraft engine in accordance with claim 1, and further comprising an outer nacelle, and wherein at least one chosen from the outer nacelle and the core engine is axis-symmetrical.

15. An aircraft comprising:
    a fuselage with a tail;
    a wing;
    at least one adaptive aircraft engine in accordance with claim 1,
    wherein the at least one adaptive aircraft engine is positioned at the tail above the wing.

16. The adaptive aircraft engine in accordance with claim 1, wherein during subsonic operation, a bypass ratio $$\frac{\text{Flow through first and second bypass duct}}{\text{Flow through fan rotor} - (\text{Flow through first and second bypass duct})}$$

is 3.8.

17. The adaptive aircraft engine in accordance with claim 1, wherein a bypass ratio is 1 for the inner bypass duct during the supersonic and subsonic operation.

* * * * *